US006951081B2

United States Patent
Bonshor

(10) Patent No.: US 6,951,081 B2
(45) Date of Patent: Oct. 4, 2005

(54) WATER DEFLECTING APPARATUS

(76) Inventor: David J. Bonshor, 1652 - 138 Street, Surrey, BC (CA), V4A 8N3

( * ) Notice: Subject to any disclaimer, the term of this patent is extended or adjusted under 35 U.S.C. 154(b) by 20 days.

(21) Appl. No.: 10/328,018

(22) Filed: Dec. 26, 2002

(65) Prior Publication Data
US 2003/0136060 A1 Jul. 24, 2003

Related U.S. Application Data
(60) Provisional application No. 60/343,997, filed on Jan. 2, 2002.

(51) Int. Cl.[7] ............... E04D 13/00; E04D 1/36; E04B 1/70
(52) U.S. Cl. .............. 52/97; 52/58; 52/60; 52/302.1
(58) Field of Search ............... 52/58, 211, 302.1, 52/302.6, 60, 97; 248/205.1, 906

(56) References Cited

U.S. PATENT DOCUMENTS

| 4,381,063 | A | | 4/1983 | Leong |
| 4,646,488 | A | * | 3/1987 | Burns ............................ 52/94 |
| 4,726,152 | A | | 2/1988 | Vagedes et al. |
| 4,875,318 | A | | 10/1989 | MacLeod et al. |
| 4,920,708 | A | | 5/1990 | MacLeod et al. |
| 5,000,409 | A | | 3/1991 | MacLeod et al. |
| 5,018,333 | A | * | 5/1991 | Bruhm ....................... 52/741.4 |
| 5,303,522 | A | | 4/1994 | Vagedes |
| 5,326,060 | A | | 7/1994 | Chubb et al. |
| 5,549,266 | A | | 8/1996 | Mitchell et al. |
| 5,675,940 | A | * | 10/1997 | Bahar et al. .................... 52/58 |
| 5,918,431 | A | | 7/1999 | Schiedegger et al. |
| 6,076,310 | A | | 6/2000 | Kim |
| 6,119,416 | A | | 9/2000 | Larson |
| 6,151,838 | A | * | 11/2000 | Husein .......................... 52/58 |
| 6,155,008 | A | * | 12/2000 | McKee ........................ 52/198 |

* cited by examiner

Primary Examiner—Peter M. Cuomo
Assistant Examiner—Sarah C. Burnham
(74) Attorney, Agent, or Firm—Norman M Cameron

(57) ABSTRACT

A water deflecting apparatus is provided for a fixture mounted on a wall. The apparatus comprises a mounting plate having a front and a back. A protrusion extends outwardly from the front of the mounting plate, the protrusion having an aperture for extending about the fixture, a bottom and a top which slopes downwardly to at least one side of the opening when the apparatus is mounted on the wall, thereby deflecting water towards said at least one side of the opening. A passageway extends downwardly from the top towards the bottom thereof and is spaced-apart from the opening, thereby deflecting water away from the fixture.

43 Claims, 7 Drawing Sheets

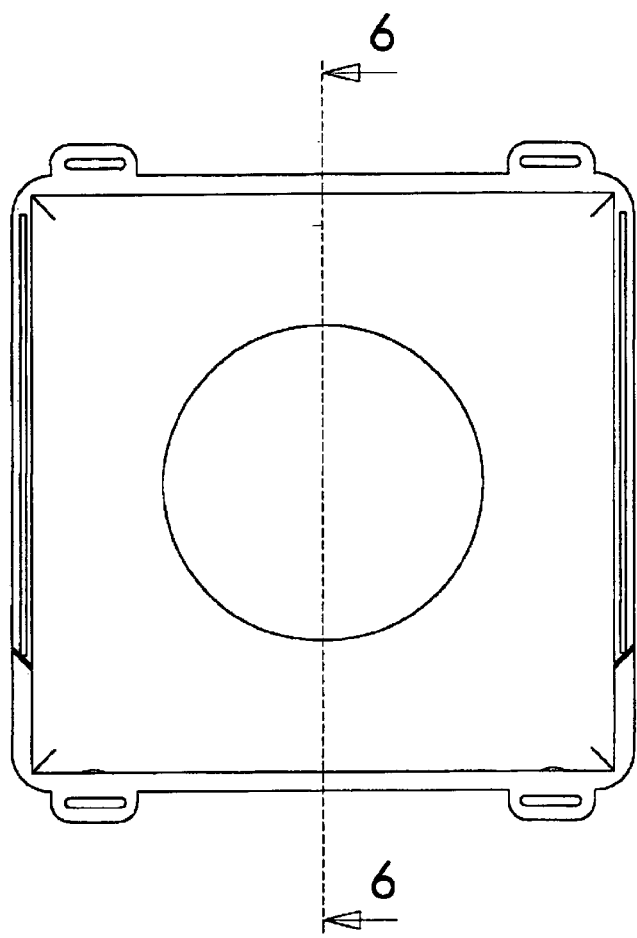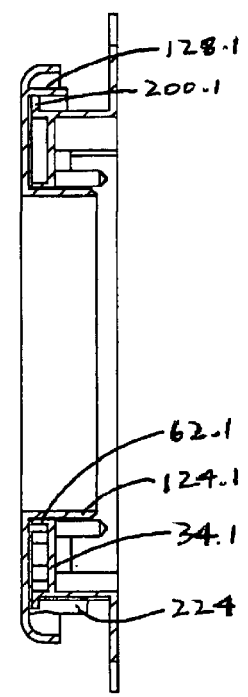
Fig. 5
6-6
Fig. 6

US 6,951,081 B2

WATER DEFLECTING APPARATUS

CROSS-REFERENCE TO RELATED APPLICATION

This application claims the benefit of provisional application 60/343,997 filed Jan. 2, 2002.

BACKGROUND OF THE INVENTION

This invention relates to water deflecting apparatuses and, in particular, to water deflecting apparatuses for deflecting water away from outdoor fixtures.

Outdoor electrical fixtures present a significant risk for water seeping into the walls of a building and causing damage over time. Various apparatuses have been developed in the past to try and alleviate this problem, but without complete success. One of the reasons for this is that such apparatuses are aimed more at directing water away from the fixture and are not designed to prevent water from seeping between the exterior cladding of the building and the sheathing. Typically such apparatuses include a mounting flange which is nailed to the sheathing and the cladding is placed over the mounting flange. There is a central protrusion with an aperture receiving the fixture. The protrusion deflects water away from the fixture, but potentially the water may accumulate between the cladding and the sheathing, leading to water damage of the sheathing or other building components.

Typical devices developed in the past included a basic piece which is attached to the wall sheathing of the building's structure and a cover plate which installs over the top of the base piece. Earlier patents showing similar devices include U.S. Pat. Nos. 4,726,152; 4,920,708; 5,549,266; 6,076,310 and 5,303,522.

SUMMARY OF THE INVENTION

There is provided, according to one aspect of the invention, a water deflecting apparatus for a fixture mounted on a wall. The apparatus comprises a member having a mounting plate with a front and a back. A protrusion extends outwardly from the front of the mounting plate, the protrusion having an opening for extending about the fixture, a bottom and a top which slopes downwardly to at least one side of the opening when the apparatus is mounted on the wall, thereby deflecting water towards said at least one side of the opening. A passageway extends downwardly from the top towards the bottom thereof and is spaced-apart from the opening, thereby deflecting water away from the fixture.

The protrusion may have opposite sides, the top having a center between the two sides and being sloped downwardly from the center towards the sides, the apparatus having one said passageway along each said side.

The sides may have upwards extensions adjacent each of the sides which extend upwardly beyond the passageways, the passageways being between the extensions and the top, the extensions directing water into the passageways.

The apparatus may include a cover plate releasably connected to the protrusion.

In one example The member has an open bottom. The opening is rectangular and is dimensioned to fit about pre-existing fixture mounting brackets.

The invention offers significant advantages compared to prior art. In particular it provides means for channelling water away from the interface between the exterior siding and the sheathing of the wall of the building. Prior art devices have not incorporated features which sufficiently channel water away from this interface, thus permitting water to build up against the sheathing and eventually causing water damage and rotting of the sheathing. The invention, on the other hand, channels water outwardly to the exterior of the cladding and thus avoids water damage.

BRIEF DESCRIPTION OF THE DRAWINGS

In drawings which illustrate embodiments of the invention:

FIG. 5 is a front plan view of the embodiment of FIG. 3;

FIG. 6 is a sectional view taken along line 6—6 of FIG. 5;

DETAILED DESCRIPTIONS OF THE PREFERRED EMBODIMENTS

Figure 7:
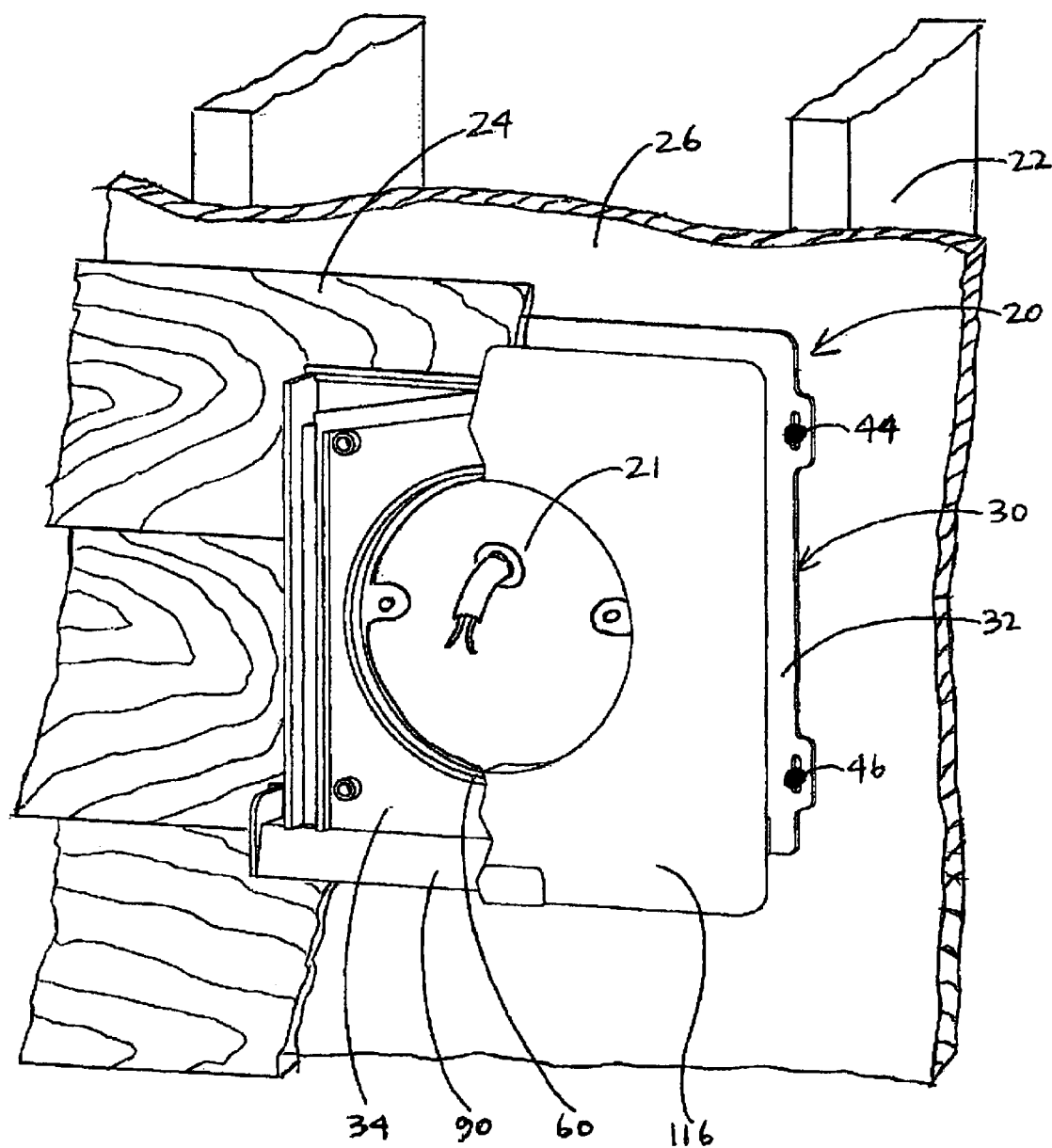
FIG. 7 is a front plan view, partly broken away, of the embodiment of FIG. 1 mounted on a wall shown in fragment.

Referring to the drawings, and first to FIG. 7, the shows an apparatus 20, according to an embodiment of the invention, for deflecting water from an electrical fixture 21 mounted on a wall 22 which includes sheathing 26 covered by siding 24. The invention is however not restricted to electrical fixtures. It can also be used for dryer vents, pipes and other "through-wall" protrusions or openings. In this example the siding is aluminum siding, although the invention is also applicable to vinyl siding and other stepped siding overlays. The apparatus 20 includes an inner, or rear, member 30 including a mounting plate 32 and a protrusion 34 best seen in FIG. 1. The mounting plate is rectangular and has a series of four tabs 36, 38, 40 and 42, each having a slotted opening 44 in this example to receive a fastener, such as nails 44 and 46, shown in FIG. 7, to mount the apparatus on the sheathing 26.

Figure 1:
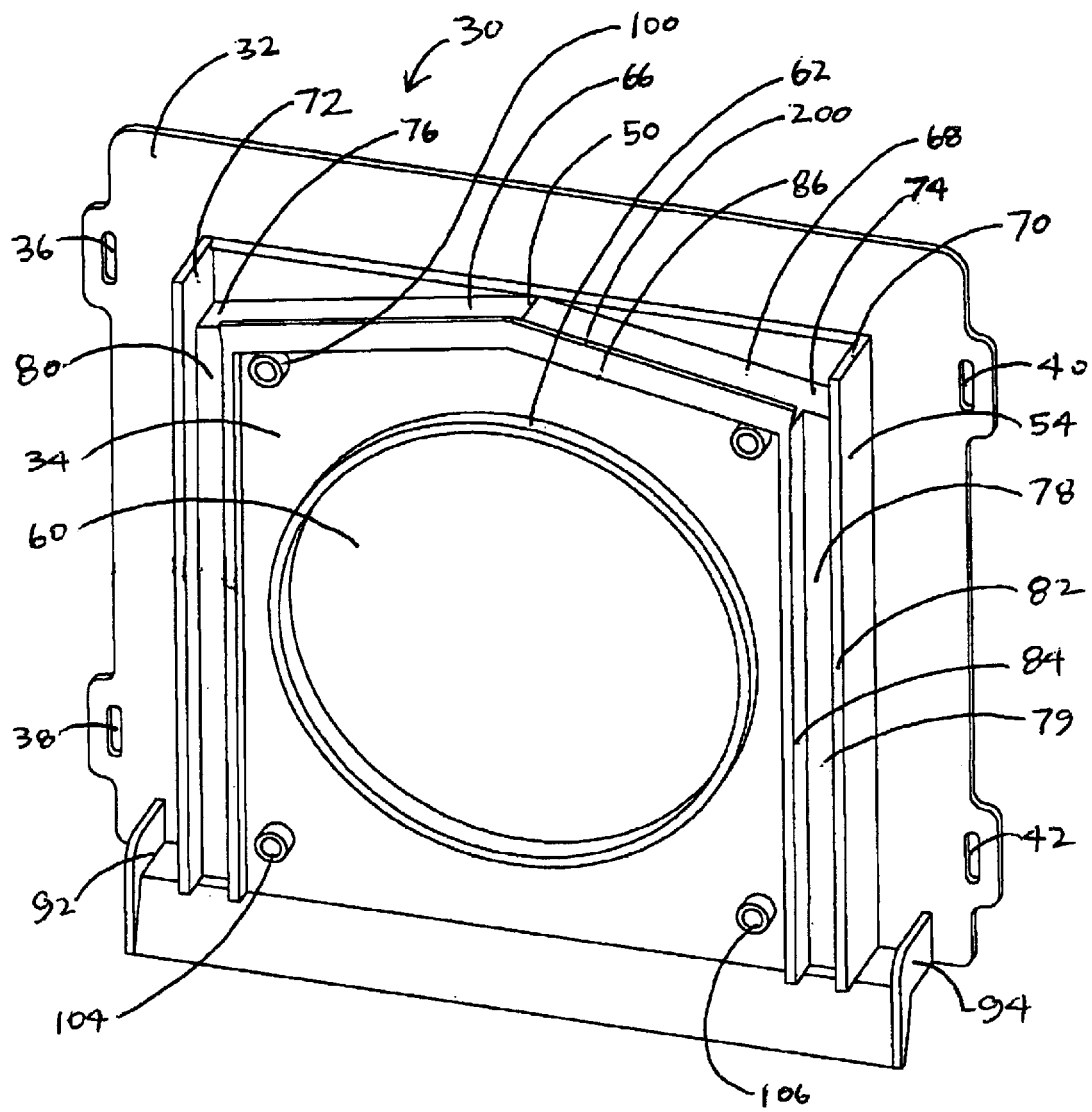
FIG. 1 is a front, isometric view of a rear portion of an apparatus for deflecting water from a fixture mounted on a wall, according to an embodiment of the invention.

Protrusion 34 is generally rectangular as seen in FIG. 1, having a top 50, a bottom 52, a right side 54 and a left side 56. The terms "top, bottom, right and left" are used in relation to the position shown in FIGS. 1 and 7 as the apparatuses are mounted on a wall. The protrusion has an opening 60, circular in this example, for extending about the fixture 21. A circular flange 62 extends about the opening. In other embodiments the fixture could be rectangular, for example to house a pair of electrical sockets, and the aperture would be correspondingly rectangular.

The top 50 includes two portions 66 and 68 which slope downwardly from center 70 of the top towards the sides 56 and 54 respectively. The sloping portions of the top, as may be seen, deflect water from the top towards the sides 54 and 56. There is an upstanding flange 200 extending along the front of the top and spaced-apart from the mounting plate 32.

The sides 54 and 56 have upward extensions 70 and 72 respectively which extend above adjoining ends 74 and 76 of the top and divert water into passageways 78 and 80 which extend from top 50 to bottom 52 of the protrusion. The passageways in this example are formed by spaced-apart flanges 82 and 84 shown for passageway 78 in FIG. 1, and a connecting web 79. Flange 82 extends from the bottom of the protrusion to the top of upward extension 70, while flange 84 extends from the bottom of the protrusion to the top thereof where it merges with flange 86 extending along the front of the top.

There is a skirt 90 serves as a diverter extending along the bottom of the rear member 30 between brackets 92 and 94. In use, the skirt fits over the siding 24 as seen in FIG. 7 to divert water away from the mounting plate and shed water onto the exterior of the siding.

Figure 2:
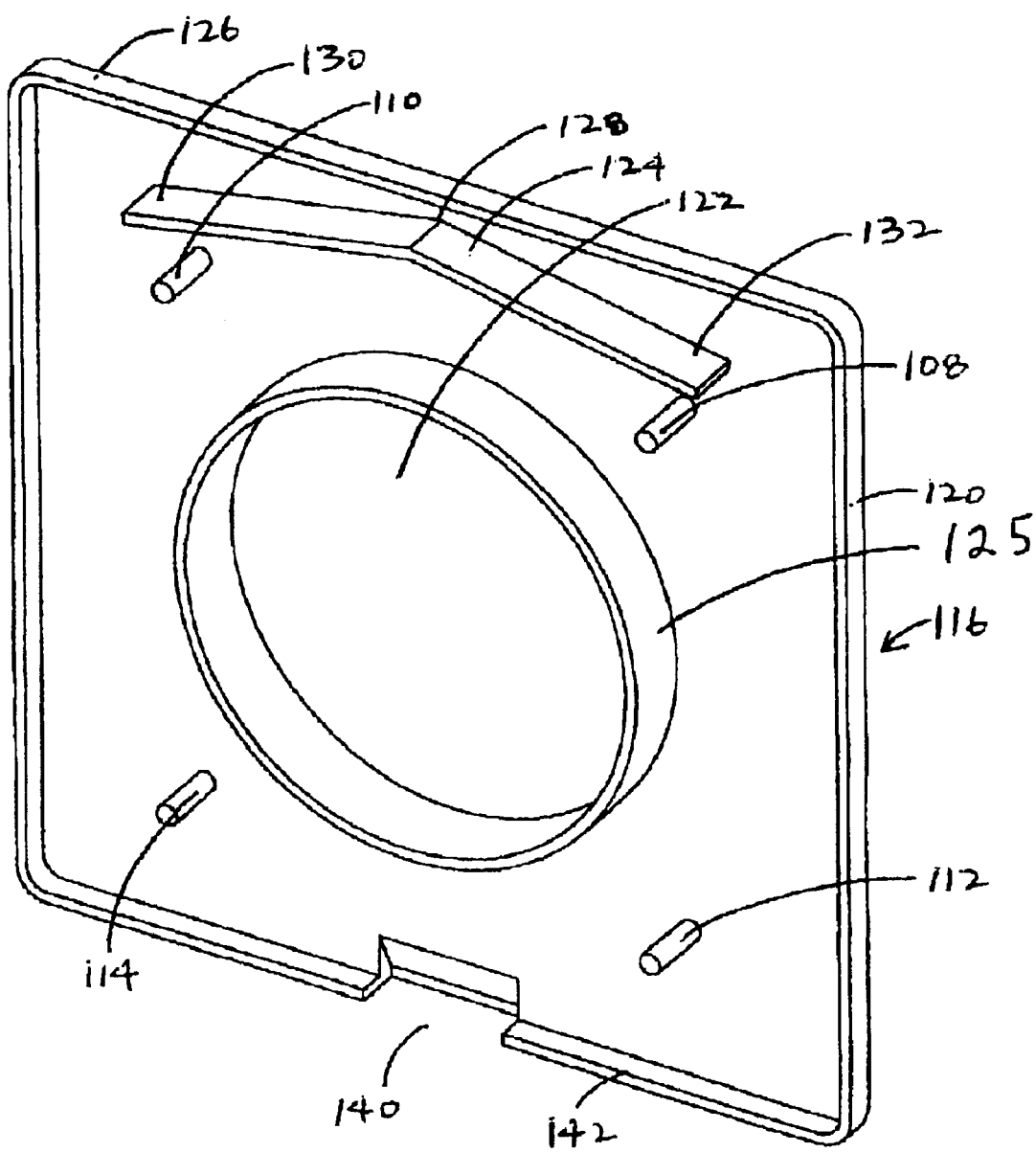
FIG. 2 is a rear, isometric view of the cover thereof.

The member 30 has four sockets 100, 102, 104 and 106 located near the corners thereof which receive four pins 108, 110, 112 and 114 of cover plate 116, best shown in FIG. 2. The cover plate is rectangular, having a flange 120 extending around all four sides. The cover has an aperture 122 surrounded by a flange 125 which in this example is circular and slightly larger in diameter than the flange 62 on the rear portion 30. The flange 125 fits over the flange 62 and snugly engages the flange when the apparatus is assembled as shown in FIG. 7.

The cover plate has a deflector 124 near top 126 thereof with a center 128 and opposite ends 130 and 132. The deflector is sloped downwardly from the center towards the opposite ends and is generally similar in shape to the top of the protrusion 34 shown in FIG. 1. The deflector fits over the top of the protrusion to further deflect water away from the fixture 21. However this deflector can be omitted in alternative embodiments of the invention. The cover plate has a slot 140 in the flange 120 near the center of the bottom 142 of the cover plate. This provides an exit for water accumulating on the top of the flange.

As may be seen in FIG. 7, the siding 24 is fitted over the mounting plate 34, but is cut to extend about the protrusion 34 and with skirt 90 fitting over the siding. It may be seen that any water entering the top of the apparatus 20 falls on either deflector 124 of the cover plate or top 50 of the protrusion, both of which slope downwardly towards the sides of the protrusion. The water is then directed by upward extensions 70 and 72 into the passageways 78 and 80 where it drops downwardly and is deflected over the siding 24 by skirt 90 and can exit the apparatus through the slot 140 in the cover plate.

An alternative embodiment to shown in FIGS. 3–6 where like parts have like numbers with the addition of "0.1". This embodiment is generally similar to the previous embodiment but includes some additional features. There is a series of four deflectors 202, 204, 206 and 208 on front 210 of the protrusion below the top 50.1 thereof. Each of these deflectors extends downwardly and outwardly towards sides 54.1 or 56.1 where they communicate with one of the passageways 78.1 or 80.1. For example, deflector 202 communicates with passageway 80.1 through slot 210, while deflector 206 communicates with the same passageway through slot 212. Likewise the deflectors 204 and 208 communicate with passageway 78.1 through slot 214 and 216, respectively. There is a series of grooves 217,219, three in this example, extending vertically along the mounting plate to each side of the protrusion. There is an angled diverter 221,223, at the bottom of each set of grooves extending to a position above each of the troughs 222 and 220 respectively.

Also this embodiment has a pair of troughs 220 and 222 adjacent the bottoms of the passageways 80.1 and 78.1 respectively. These troughs serve as diverters and extend outwardly away from the mounting plate 32.1. This embodiment does not have a skirt similar to skirt 90 of the previous embodiment. Instead, cover plate 116.1, shown in FIG. 4, has a pair of troughs 224 and 226 which fit below the troughs 220 and 222 shown in FIG. 3. Each of these has an opening 228 located above an opening 230 in flange 120.1 which provides an exit for water.

Figure 3:
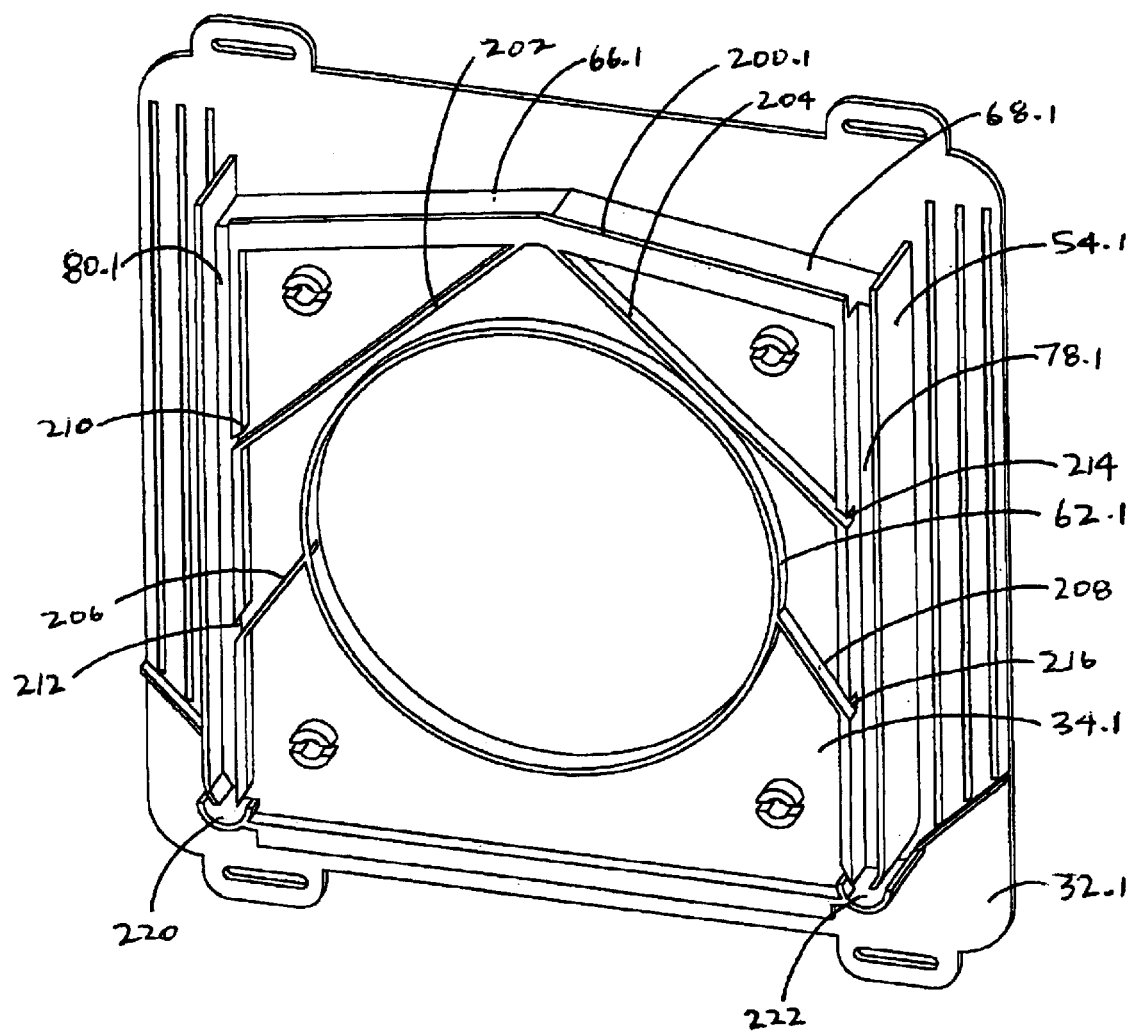
FIG. 3 is a view similar to FIG. 1 of an apparatus for deflecting water according to an alternative embodiment of the invention.
Figure 4:
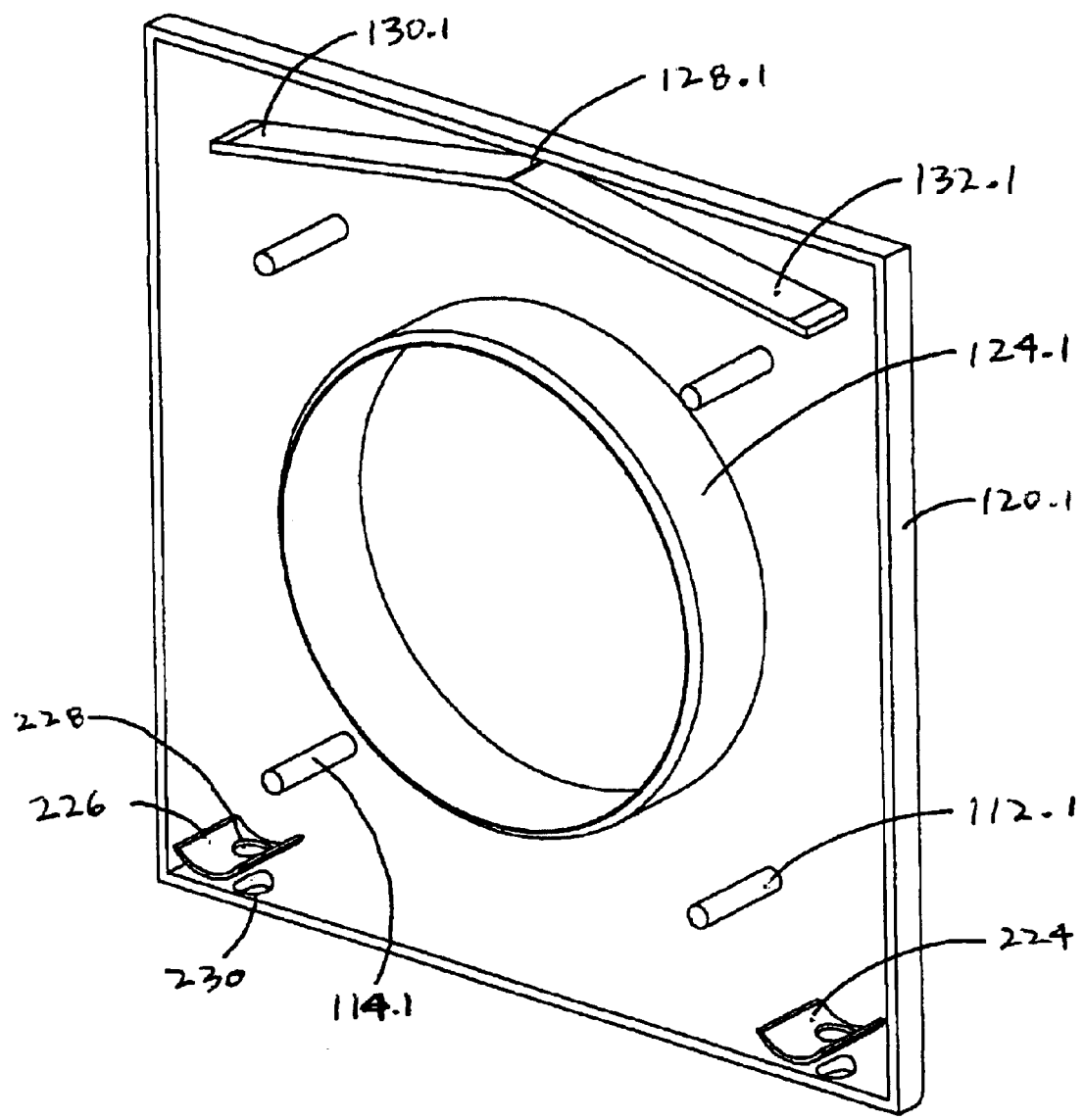
FIG. 4 is a view similar to FIG. 2, but showing the cover for the embodiment of FIG. 3.
Figure 8:
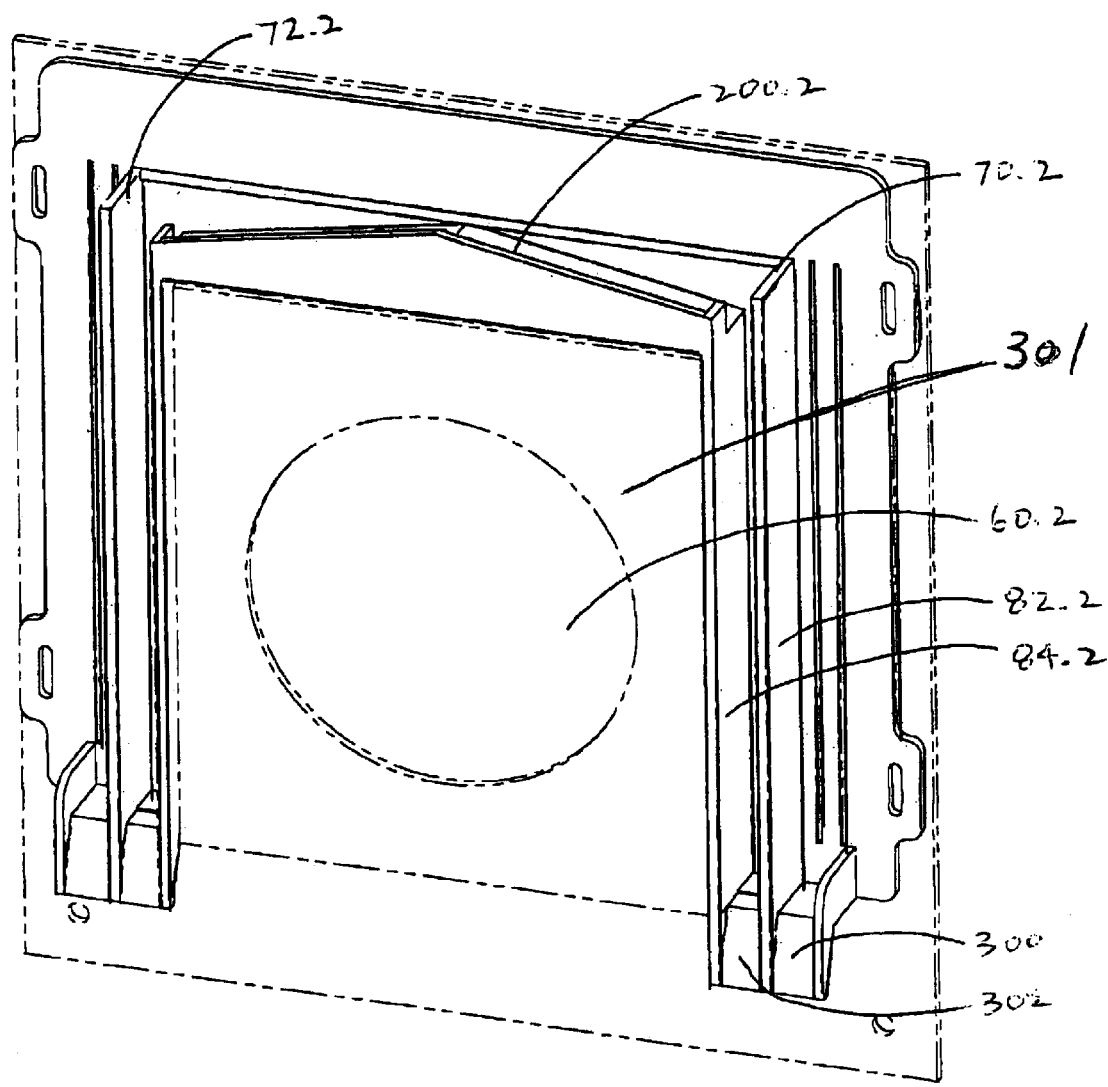
FIG. 8 is an isometric view similar to FIG. 1 of a further alternative embodiment of the invention intended to fit over an existing fixture mounting bracket, the existing fixture mounting bracket being shown in ghost.

FIG. 8 shows a further alternative embodiment of the invention which is generally similar to the embodiment of FIG. 3, but is intended to fit over an existing, conventional fixture mounting bracket 301 shown in ghost. Accordingly bottom to 98 is open and opening 60.2 is rectangular and is dimensioned to fit over existing brackets (5.100"×5.701") in this example. In place of the troughs it has a pair of individual diverters or spouts 300 and 302 on each side. As seen for passageway 78.2, there is a spout 302 at the bottom of each of the passageways. Spout 300 is located at the bottom of member 30 between bracket 94 and flange 82. These spouts serve to discharge water in the same manner as the skirt 90 shown in FIG. 7.

The protrusions of the above examples are peaked in the center and slope downwardly towards the sides of the protrusion. In other examples the tops could be sloped towards one side only with a single passageway for water down that side.

It will be understood by someone skilled in the art that many of the details described above are given by way of example only and can be omitted or altered without departing from the scope of the invention which is to be interpreted with reference to the following claims.

What is claimed is:

1. A water deflecting apparatus for a fixture mounted on a wall, the apparatus comprising a member having:
    a mounting plate with a front and a back;
    a protrusion extending outwardly from the front of the mounting plate, the protrusion having an opening for extending about the fixture, a bottom and a top which slopes downwardly to at least one side of the opening when the apparatus is mounted on the wall, thereby deflecting water towards said at least one side of the opening, and a passageway extending downwardly from the top towards the bottom thereof and spaced-apart from the opening, thereby deflecting water away from the fixture, the top having a front spaced-apart from the mounting plate and an upstanding flange extending along the front; and
    a cover plate releasably connected to the protrusion, the cover plate having a deflector generally similar in shape to the top of the protrusion and which fits over the top of the protrusion to deflect water therefrom.

2. The apparatus as claimed in claim 1, wherein the protrusion has opposite sides, the top having a center between the two sides and being sloped downwardly from the center towards the sides, the apparatus having one said passageway along each said side.

3. The apparatus as claimed in claim 2, each said passageway having a bottom, the apparatus including a diverter adjacent to the bottom of each said passageway which diverts water away from the mounting plate.

4. The apparatus as claimed in claim 3, the sides having upwards extensions adjacent each of the sides which extend upwardly beyond the passageways, the passageways being between the extensions and the top, the extensions directing water into the passageways.

5. The apparatus as claimed in claim 4, wherein the passageways are formed by a pair of spaced apart flanges on the protrusion which extend downwardly and have bottoms below the opening.

6. The apparatus as claimed in claim 1, wherein the protrusion has a flange extending about the opening, the cover plate having an opening aligned with the opening in the protrusion and having a flange which tightly and releasably engages the flange on the protrusion.

7. The apparatus as claimed in claim 6, wherein the cover plate has a bottom and a slot therein, permitting water to exit the apparatus.

8. The apparatus as claimed in claim 1, wherein the cover plate deflector has a raised center and slopes downwardly from the center towards opposite sides thereof adjacent the sides of the protrusion.

9. The apparatus as claimed in claim 8, having at least one deflector on the protrusion extending downwardly and outwardly and being located below the top of the protrusion, said at least one deflector communicating outwardly with one of the passageways to deflect water from the opening into the passageway.

10. The apparatus as claimed in claim 9, including troughs adjacent to the bottoms of the passageways and extending outwardly away from the mounting plate.

11. The apparatus as claimed in claim 1, wherein the opening is dimensioned to fit about pre-existing fixture mounting brackets.

12. A water deflecting apparatus for a fixture mounted on a wall, the apparatus comprising a member having:
    a mounting plate with a front and a back;
    a protrusion extending outwardly from the front of the mounting plate, the protrusion having an aperture for extending about the fixture, a bottom, a top and a passageway extending downwardly from the top towards the bottom thereof and spaced-apart from the opening, thereby deflecting water away from the fixture, the passageway being spaced-apart outwardly from the mounting plate, thereby deflecting water from the mounting plate, the top sloping downwardly to at least one side of the opening when the apparatus is mounted on the wall, thereby deflecting water towards said at least one side of the opening, the top having a front spaced-apart from the mounting plate and an upstanding flange extending along the front; and
    a cover plate releasably connected to the protrusion, the cover plate having a deflector generally similar in shape to the top of the protrusion which fits over the top of the protrusion to deflect water therefrom.

13. The apparatus as claimed in claim 12, wherein the passageway has a bottom, the apparatus including a diverter adjacent to the bottom of the passageway which diverts water away from the mounting plate.

14. In combination
    a wall;
    a fixture mounted on the wall; and
    a water deflecting apparatus mounted on the wall, the apparatus including a member having a mounting plate with a front and a back, a protrusion extending outwardly from the front of the mounting plate, the protrusion having an opening extending about the fixture, a bottom and a top which slopes downwardly to at least one side of the opening when the apparatus is mounted on the wall, thereby deflecting water towards said at least one side of the opening, the protrusion having a first flange and a second flange, the first flange and the second flange extending downwardly from the top towards the bottom thereof, the first flange being spaced-apart from the opening, the second flange being spaced apart from the first flange to form a passageway therebetween, the top having a front and an upstanding flange extending along the front and spaced apart from the mounting plate, the top sloping downwardly to at least one side of the opening when the apparatus is mounted on the wall, thereby deflecting water towards said at least one side of the opening, the protrusion having opposite sides, the top having a center between the two sides and being sloped downwardly from the canter towards the sides, the apparatus having one said passageway along each said side, a cover plate releasably connected to the protrusion, the cover plate having a deflector generally similar in shape to the top of the protrusion which fits over the top of the protrusion to deflect water therefrom.

15. The combination as claimed in claim 14, the sides having upwards extensions adjacent each of the sides which extend upwardly beyond the passageways, the passageways being between the extensions and the top, the extensions directing water into the passageways.

16. The combination as claimed in claim 15, wherein the passageways are formed by a pair of spaced apart flanges on the protrusion which extend downwardly and have bottoms below the opening.

17. The combination as claimed in claim 16, including troughs adjacent to the bottoms of the passageways and extending outwardly away from the mounting plate.

18. The combination as claimed in claim 16, each said passageway having a bottom, the apparatus including a diverter adjacent to the bottom of each said passageway which diverts water away from the mounting plate.

19. The combination as claimed in claim 14, wherein the protrusion has a flange extending about the opening, the cover plate having an opening aligned with the opening in the protrusion and having a flange which tightly and releasably engages the flange on the protrusion.

20. The combination as claimed in claim 19, wherein the cover plate has a bottom and a slot therein, permitting water to exit the apparatus.

21. The combination as claimed in claim 14, wherein the cover plate deflector has a raised center and slopes downwardly from the center towards opposite sides thereof adjacent the sides of the protrusion.

22. The combination as claimed in claim 21, having at least one deflector on the protrusion extending downwardly and outwardly and being located below the top of the protrusion, said at least one deflector communicating outwardly with one of the passageways to deflect water from the opening into the passageway.

23. The combination as claimed in claim 14, including siding connected to the wall and extending over the mounting plate about the protrusion on a side of the second flange opposite the passageway and between the mounting plate and the cover plate.

24. The combination as claimed in claim 14, wherein the opening fits about a conventional fixture mounting bracket mounted on the wall.

25. A water deflecting apparatus for a fixture mounted on a wall, the apparatus comprising a member having:
    a mounting plate with a front and a back;
    a protrusion extending outwardly from the front of the mounting plate, the protrusion having opposite sides, an opening for extending about the fixture, a bottom, a top and a passageway along each side extending downwardly from the top towards the bottom thereof and spaced-apart from the opening, the top having a center between the opposite sides and being sloped downwardly from the center towards the sides when the sides when the apparatus is mounted on the wall, thereby deflecting water towards the opposite sides of the opening towards respective passageways, each said passageway having a bottom, the apparatus including a diverter adjacent to the bottom of each said passageway which diverts water away from the mounting plate; and a cover plate releasably connected to the protrusion, the passageway being between the cover plate and the protrusion to form a duct to guide the water to the bottom.

26. The apparatus as claimed in claim 25, the sides having upwards extensions adjacent each of the sides which extend upwardly beyond the passageways, the passageways being between the extensions and the top, the extensions directing water into the passageways.

27. The apparatus as claimed in claim 26, wherein the passageways are formed by a pair of spaced apart flanges on the protrusion which extend downwardly and have bottoms below the opening.

28. The apparatus as claimed in claim 27, wherein the protrusion has a flange extending about the opening, the cover plate having an opening aligned with the opening in the protrusion and having a flange which tightly and releasably engages the flange on the protrusion.

29. The apparatus as claimed in claim 28, wherein the cover plate has a bottom and a slot therein, permitting water to exit the apparatus.

30. The apparatus as claimed in claim 29, wherein the cover plate deflector has a raised center and slopes downwardly from the center towards opposite sides thereof adjacent the sides of the protrusion.

31. The apparatus as claimed in claim 30, having at least one deflector on the protrusion extending downwardly and outwardly and being located below the top of the protrusion, said at least one deflector communicating outwardly with one of the passageways to deflect water from the opening into the passageway.

32. The apparatus as claimed in claim 31, including troughs adjacent to the bottoms of the passageways and extending outwardly away from the mounting plate.

33. The apparatus as claimed in claim 32, wherein the opening is rectangular and is dimensioned to fit about pre-existing fixture mounting brackets.

34. A water deflecting apparatus for a fixture mounted on a wall with siding, the apparatus comprising a member having:

a mounting plate with a front and a back; and a protrusion extending outwardly from the front of the mounting plate, the protrusion having an opening for extending about the fixture, a bottom end a top which slopes downwardly to at least one side of the opening when the apparatus is mounted on the wall, thereby deflecting water towards said at least one side of the opening, the protrusion having a first flange and a second flange, the first flange and the second flange extending downwardly from the tap towards the bottom thereof, the first flange being spaced-apart from the opening, the second flange being spaced apart from the first flange to form a passageway therebetween;

the passageway guiding water from the top to the bottom, the siding fitting over the mounting plate about the protrusion on a side of the second flange opposite the passageway.

35. The apparatus as claimed in claim 34, wherein the protrusion has opposite sides, the top having a center between the two sides and being sloped downwardly from the center towards the sides, the apparatus having one said passageway along each said side.

36. The apparatus as claimed in claim 35, each said passageway having a bottom, the apparatus including a diverter adjacent to the bottom of each said passageway which diverts water away from the mounting plate.

37. The apparatus as claimed in claim 36, the sides having upwards extensions adjacent each of the sides which extend upwardly beyond the passageways, the passageways being between the extensions and the top, the extensions directing water into the passageways.

38. The apparatus as claimed in claim 37, wherein the protrusion has a flange extending about the opening, the cover plate having an opening aligned with the opening in the protrusion and having a flange which tightly and releasably engages the flange on the protrusion.

39. The apparatus as claimed in claim 38, wherein the cover plate has a bottom and a slot therein, permitting water to exit the apparatus.

40. The apparatus as claimed in claim 39, wherein the cover plate deflector has a raised center and slopes downwardly from the center towards opposite sides thereof adjacent the sides of the protrusion.

41. The apparatus as claimed in claim 40, having at least one deflector on the protrusion extending downwardly and outwardly and being located below the top of the protrusion, said at least one deflector communicating outwardly with one of the passageways to deflect water from the opening into the passageway.

42. The apparatus as claimed in claim 41, including troughs adjacent to the bottoms off the passageways and extending outwardly away from the mounting plate.

43. The apparatus as claimed in claim 42, wherein the opening is rectangular and is dimensioned to fit about pre-existing fixture mounting brackets.

* * * * *